US011733781B2

(12) United States Patent
Boydston et al.

(10) Patent No.: US 11,733,781 B2
(45) Date of Patent: Aug. 22, 2023

(54) LEVERAGING MACHINE LEARNING AND FRACTAL ANALYSIS FOR CLASSIFYING MOTION

(71) Applicant: PROJECT DASEIN LLC, Eugene, OR (US)

(72) Inventors: Cooper Ray Boydston, Creswell, OR (US); Sean Michael Roach, Terrebonne, OR (US); Richard Philip Taylor, Eugene, OR (US)

(73) Assignee: PROJECT DASEIN LLC, Eugene, OR (US)

( * ) Notice: Subject to any disclaimer, the term of this patent is extended or adjusted under 35 U.S.C. 154(b) by 125 days.

(21) Appl. No.: 16/837,188

(22) Filed: Apr. 1, 2020

(65) Prior Publication Data

US 2020/0319714 A1 Oct. 8, 2020

Related U.S. Application Data

(60) Provisional application No. 62/828,152, filed on Apr. 2, 2019.

(51) Int. Cl.
*G06F 3/01* (2006.01)
*G06N 20/00* (2019.01)
*G06T 7/20* (2017.01)
*G01B 11/25* (2006.01)

(52) U.S. Cl.
CPC ............ *G06F 3/017* (2013.01); *G01B 11/25* (2013.01); *G06F 3/011* (2013.01); *G06N 20/00* (2019.01); *G06T 7/20* (2013.01); *G06F 2203/011* (2013.01)

(58) Field of Classification Search
None
See application file for complete search history.

(56) References Cited

U.S. PATENT DOCUMENTS

| | | | | |
|---|---|---|---|---|
| 2005/0240086 | A1* | 10/2005 | Akay | A61B 5/1124 600/595 |
| 2011/0018864 | A1* | 1/2011 | Ishibashi | G06T 15/20 345/419 |
| 2011/0205355 | A1* | 8/2011 | Liu | G06T 7/80 348/135 |
| 2012/0065524 | A1* | 3/2012 | Morren | A61B 5/1102 73/514.01 |
| 2016/0338644 | A1* | 11/2016 | Connor | A61B 5/1126 |
| 2017/0119298 | A1* | 5/2017 | Cheung | G06K 9/00248 |
| 2017/0188894 | A1* | 7/2017 | Chang | A61B 5/1121 |
| 2017/0221257 | A1* | 8/2017 | Meeh | G06T 19/20 |
| 2017/0287146 | A1* | 10/2017 | Pathak | G16H 15/00 |
| 2018/0033150 | A1* | 2/2018 | Lieblich | G06T 7/12 |
| 2018/0160943 | A1* | 6/2018 | Fyfe | A61B 5/1112 |
| 2018/0168780 | A1* | 6/2018 | Kopelman | G06K 9/6212 |
| 2018/0239434 | A1* | 8/2018 | Lu | G06T 19/00 |
| 2018/0247024 | A1* | 8/2018 | Divine | G06T 11/60 |
| 2020/0211243 | A1* | 7/2020 | Ulusoy | G06T 11/60 |
| 2020/0233490 | A1* | 7/2020 | Onyekwelu | G06F 3/013 |
| 2021/0295544 | A1* | 9/2021 | Yan | G06T 7/337 |

* cited by examiner

Primary Examiner — Justin S Lee
(74) Attorney, Agent, or Firm — Taft Stettinius & Hollister LLP; Anthony P. Filomena, II (57) ABSTRACT

A machine learning and fractal analysis process for classifying human or animal motion, including the classification of patterns generated by human or animal motion in order to assess the quality of athletic performance, artistic performance, form, or other quality of motion.

18 Claims, 5 Drawing Sheets

LEVERAGING MACHINE LEARNING AND FRACTAL ANALYSIS FOR CLASSIFYING MOTION

CROSS-REFERENCE TO RELATED APPLICATIONS

This application claims the benefit of U.S. Provisional Application Ser. No. 62/828,152 filed on Apr. 2, 2019, the contents of which are incorporated herein by reference in their entirety.

BACKGROUND

The statements in this background section merely provide background information related to the present disclosure and should not be construed as constituting prior art.

Authenticating abstract drip painting as being authentic paintings of the original master artist is a challenge due to the nature of the pieces. To create an artwork in this style, a canvas is placed on the floor, and the artist allows paint to drip down from the brush to the canvas. As the artist moves over the canvas, paint is dropped from the brush creating a trace of the movement patterns made by the painter.

Additionally, every individual's body has a set of biomechanical motion variations (bio-variations), or natural motions, which interact at multiple scales to drive many forms of activity from dance to the creation of art. These bio-variations exhibit subtle variations from individual to individual (e.g., elite athletes vs. casual joggers, famous artists vs crude imitators, etc.), but also within individuals when their condition changes (e.g., from fatigue, physical injury, psychological, physiological or neurological conditions, age, concentration, etc.).

One bio-variation pattern of particular interest is the identification of fatigue in running. In particular, running related injuries are very common, and it is believed that a major cause of such injuries is due to the breakdown of running form once the runner becomes fatigued. To this end, it is also suspected that many running related injuries are also caused by poor running form in response to muscle weakness or poor motor control patterns.

In a physical therapy clinic, a therapist works with a patient to guide exercises and ensure that the patient is performing the movements with proper form. Patients who are not familiar with the exercises are often hesitant to practice on their own for fear of injury, or may accidentally injure themselves by performing the exercise improperly.

The technologies described herein are intended to address and/or to improve upon some of the above-mentioned issues and challenges within the relevant industry.

SUMMARY

The technologies described herein are concerned, for example, with assessing the quality of movement patterns, whether artistic, athletic, or otherwise. Although conventional systems may record the quantity of movement, such as the number of steps taken, distance traveled, or number of repetitions executed, or may provide feedback concerning a limited number of key measurements, such systems do not assess the quality of the entire pattern. To accomplish this, the technologies described herein incorporate fractal analysis techniques (e.g., in conjunction with machine learning techniques) in the quantification of human or animal movement patterns.

Moreover, although conventional systems may be capable of presenting a time series graph of measurements (e.g., acceleration vs. time), such systems are incapable of generating an aesthetic orbital diagram that allows the pattern to be viewed in a more intuitive manner by the user. More particularly, the technologies described herein allow the creation of a 2D projection of motion, which in turn allows for the use of quicker, more reliable, and more advanced machine vision algorithms.

The technologies described herein may also involve a calibration procedure that may be used as a baseline when detecting running fatigue in a unique manner as described herein. More particularly, the technologies described herein may utilize a calibration procedure that trains a machine learning algorithm to assess movement quality with the assistance of a skilled observer. After the movement quality has been assessed, the system records the captured movement observations within a database that includes patterns of individuals who have been assessed by a qualified third party, such as, for instance, a licensed physical therapist, a health care practitioner or a coach. This data can then be used to train a machine learning algorithm to classify various movement patterns.

In some embodiments, the technologies described herein include the collection of movement and/or bio-variation data from users performing various activities, and a unique gestural art visualization may be created based on such data. The created visualization, in turn, highlights the subtle variations in the movement pattern, which can then be further analyzed and categorized, for example, using fractal analysis and machine learning algorithms.

In some embodiments, the technologies described herein may further provide a method for determining when a runner's form begins to exhibit movement patterns associated with fatigue. Further, the detected variations in movement pattern may be relayed to the runner as a means to recommend when the user should take a break and rest in order to avoid potential injury. Moreover, in some embodiments, the detected movement pattern variations of the runner may also be compared with clinically diagnosed individuals exhibiting similar dysfunctions in an effort to further diagnose improper form, and thus provide additional corrective feedback.

It should be appreciated that, in some embodiments, a diagnostic tool utilizing movement sensors may be available to physical therapists, trainers, and coaches for the purpose of training a user in conjunction with a machine learning algorithm. For example, after the system has been trained to identify proper form in exercise (with guidance from a physical therapist or coach), the user can use the system independently and receive feedback based on the quality of the user's movements. This may allow the patient to exercise outside of the clinic with a reduced likelihood of injury due to improper form. Additionally, in some embodiments, the system can count sets and repetitions performed by the user, thereby allowing both patient and therapist to comply with an exercise program.

In some embodiments, the technologies described herein may provide for analyzing movement patterns (e.g., other than running or physical therapy) for a variety of exercises in which improper movements may lead to injury or where feedback regarding movement quality may lead to improved performance. For example, the technologies described herein may be used in conjunction with weight lifting, baseball pitching, golf swinging, martial arts, dancing, and/or other movements/activities.

In some embodiments, the technologies described herein provide for analyzing the movement patterns of patients suffering from neurodegenerative diseases, such as Parkinson's disease, Alzheimer's disease, Huntington's disease, ALS, and/or other conditions. It has been shown that exercise can be beneficial in the treatment of many neurodegenerative diseases; however, there is an increased risk of injury due to falling or poor movement mechanics. Accordingly, the technologies described herein may be used to monitor movement patterns and provide feedback for these patients as a means to minimize the risk of injury.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

As described in greater detail below, the technologies described herein allow for the collection of bio-variation data from users performing various activities. To do so, input data may be gathered from a variety of sources including, but not limited to, paint traces of human or animal movement, inertial sensors (e.g., an IMU) relaying acceleration or orientation data, video, still images showing movement traces, and other data. In some embodiments, a method of analysis described herein involves a still image showing the trajectory of a repetitive movement pattern. For instance, inertial sensor data can be recorded and processed by projecting a three-dimensional movement pattern into a two-dimensional plane. Such a projection may essentially be a digital version of dropped paint onto a canvas that has been analyzed for a resulting pattern. If data is recorded in higher dimensions, it may first be projected to a two-dimensional trace prior to analysis (e.g., (x,y,z) (x,y), (x,z), (y,z)). Data points may then joined with a line or curve in order to create a two-dimensional image that can be inputted into the machine learning process. Instead of performing a traditional time series analysis of the motion sample, two-dimensional images may be created from each plane (e.g., side, front, top) and may be analyzed as a static image similar to an abstract drip painting. It should be appreciated that conversion to a two-dimensional image allows for the use of highly efficient and optimized machine vision algorithms. Additionally, a visually aesthetic image may be created by overlaying multiple repetitions of the movement pattern in question, and this image can be presented to the user for intuitive feedback. It should be appreciated that the various motions can be displayed in x, y, z space to generate a "spatial portrait" of the individual or displayed in acceleration space ($a_x$, $a_y$, $a_z$) to generate a "force portrait" of the individual. In other words, the various projections described herein may be made from higher dimensional data sets in positional space, acceleration space, and/or other suitable spaces. For example, in some embodiments, the projections may be from momentum space, velocity space, and/or other spaces. Further, it should be appreciated that the higher dimensional data sets from which the projections are made may be associated with non-inertial sensor data in other embodiments. Depending on the particular embodiment, the various "portraits" or projections may be used separately or together to capture the individual's unique motions. In some embodiments, data can also be sampled and transmitted to a mobile device, computer, or cloud for further analysis and feedback.

In embodiments in which data is acquired via inertial sensors, the sensors may be first placed in specific locations on the user's body. In some embodiments, the sampling rates for data acquisition may be approximately 1 kHz; however, it should be appreciated that the sampling rates may vary in other embodiments. Similarly, accelerometer sensitivity may also vary, for example, depending on the sensor placement or specific application. It should be appreciated that various different communication technologies may be utilized depending on the particular embodiment including, for example, wireless transmission to a remote device (e.g., a mobile device or computer) via Bluetooth, Wi-Fi, or communication technology. In addition, in some embodiments, data may be recorded directly to the sensor device (and/or another computing device) to be processed and analyzed at a later time. Moreover, depending on the particular embodiment, sensors may transmit data individually, or multiple sensors may be wired together and all sensor data may be transmitted from a single transmitter.

As described herein, after the data has been acquired and processed, it may be classified using a combination of machine learning and fractal analysis techniques. For example, in some embodiments, the various movement patterns of the user may be classified using such techniques. Further, in some embodiments, in addition to machine learning classification and fractal analysis of the movement patterns, an aesthetic image of the repetitive movement trajectory may also be generated from the inertial sensor data. In some embodiments, the generated image may be presented to the user as feedback and/or to track progress over time by either demonstrating improvement with practice or reduction of movement quality with fatigue. Images may also be shared with coaches, physical therapists, trainers, and/or other users.

It should be understood and appreciated herein that the technologies described herein have several features that are advantageous, particularly when compared to other processes known within the art. For example, in some embodiments, the technologies described herein make use of advanced machine vision algorithms by analyzing a two-dimensional projection of higher dimensional orbit as opposed to traditional time series analysis. Such a technique is particularly useful because machine vision algorithms developed mainly for use in other fields are very fast and accurate. Unlike conventional systems that require video for such machine learning techniques, the techniques described herein allow for the use of inertial sensors, paint, and/or other measurement devices.

In some embodiments, the technologies described herein may be leverages to measure fatigue in running specific to the individual being monitored. Other systems, by contrast, use a broad "one size fits all" assessment of biomechanics. Further, in other embodiments, the technologies described herein allow for the calibration of exercise routines to be guided by a physical therapist or experienced coach. This is particularly useful because the associated exercises are guided and individualized, and the machine learning algorithm may be thereby trained as the user is trained by the skilled observer. Other examples and embodiments are further described in detail below.

Figure 1:
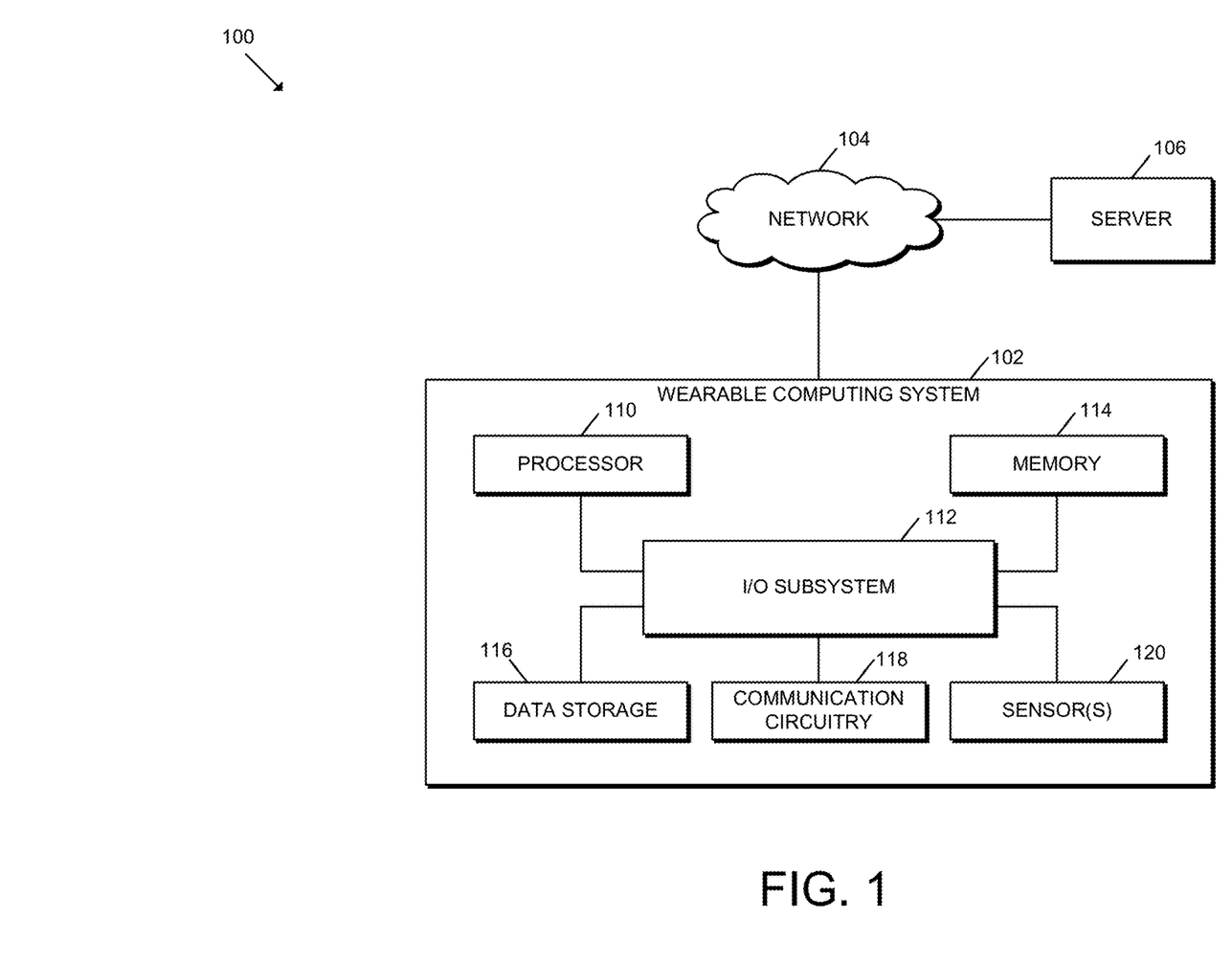
FIG. 1 is a simplified block diagram of at least one embodiment of a system for leveraging machine learning and/or fractal analysis to classify motion.

Referring now to FIG. 1, in the illustrative embodiment, a system 100 for leveraging machine learning and/or fractal analysis to classify motion includes a wearable computing system 102, a network 104, and a server 106. The wearable computing system 102 may be embodied as any type of computing device capable of being worn by a user (e.g., a smart watch, sensor assembly, cellular phone, smartphone, etc.). In other embodiments, it should be appreciated that the wearable computing system 102 may instead be embodied as one or more separate (i.e., non-worn) devices communicatively coupled to one or more sensors (e.g., worn by a user). As such, in various embodiments, it should be appreciated that the wearable computing system 102 may be embodied as and/or include a wearable computing device, a desktop computer, laptop computer, tablet computer, notebook, netbook, Ultrabook™, cellular phone, smartphone, personal digital assistant, mobile Internet device, Internet of Things (IoT) device, server, router, switch, and/or any other computing/communication device capable of performing the functions described herein.

As shown in FIG. 1, the illustrative wearable computing system 102 includes a processor 110, an input/output ("I/O") subsystem 112, a memory 114, data storage 116, a communication circuitry 118, and one or more sensors 120. Of course, the wearable computing system 102 may include other or additional components, such as those commonly found in a typical computing device/system (e.g., various input/output devices and/or other components), in other embodiments. Additionally, in some embodiments, one or more of the illustrative components, or a portion thereof, may be incorporated in the processor 110 in some embodiments. Although a single wearable computing system 102 is illustratively shown, it should be appreciated that one or more of the components of the wearable computing system 102 described herein may be distributed across multiple computing devices. In other words, the techniques described herein may be employed by a computing system that includes one or more computing devices.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the wearable computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the wearable computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the wearable computing system 102, on a single integrated circuit chip. For example, in some embodiments, one or more of the components of the wearable computing system 102 may form one or more application-specific integrated circuits (ASICs).

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the wearable computing system 102 useful for performing the functions described herein.

The communication circuitry 118 may be embodied as any communication circuit, device, or collection thereof, capable of enabling communications between the wearable computing system 102 and other remote devices (e.g., the server 106) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, etc.) to bring about such communication.

Each of the sensors 120 is configured to generate sensor data (e.g., by virtue of one or more signals), which may be interpreted by the processor 110 to determine one or more characteristics associated with the environment thereof. By way of example, the sensors 120 may detect various physical characteristics, electrical characteristics, and/or electromagnetic characteristics of its environment. For example, in the illustrative embodiment, one or more of the sensors 120 may be embodied as, or otherwise include, at least one inertial sensor (e.g., accelerometer, gyroscope, etc.). In other embodiments, the sensors 120 may include one or more other inertial sensors, environmental sensors, proximity sensors, optical sensors, electromagnetic sensors (e.g., magnetometers), audio sensors, motion sensors, piezoelectric sensors, cameras, and/or other types of sensors. Further, the wearable computing system 102 may also include components and/or devices configured to facilitate the use of the sensors 120. In some embodiments, it should be appreciated that multiple sensors 120 may be included in a single sensor module (e.g., an inertial measurement unit).

Although the sensors 120 are depicted as forming a portion of the wearable computing system 102 in FIG. 1, it should be appreciated that one or more of the sensors 120 may be separate from the wearable computing system 102 in some embodiments. Further, in such embodiments, the sensors 120 may be communicatively coupled to the wearable computing system 102 via a suitable wired or wireless communication connection. In some embodiments, each of such distributed sensors 120 may be configured to communicate directly with the wearable computing system 102, whereas in other embodiments the distributed sensors 120 may include an aggregating sensor 120 configured to collect the sensor data generated by one or more other distributed sensors 120 for transmission to the wearable computing system 102 (e.g., via a single communication path).

Further, in some embodiments, the wearable computing system 102 may be configured to be coupled to one or more peripheral devices. It should be appreciated that the particular peripheral devices may include any number of additional peripheral or interface devices, such as speakers, microphones, additional storage devices, and so forth, and may depend on, for example, the type and/or intended use of the wearable computing system 102. For example, in some embodiments, the peripheral devices may include a keyboard, mouse, display, touchscreen display, printer, alarm, status indicator, handheld device, diagnostic tool, and/or one or more other suitable peripheral devices.

The network 104 may be embodied as any type of communication network capable of facilitating communication between the wearable computing system 102 and remote devices (e.g., the server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof.

The server 106 may be embodied as any type of computing device capable of performing the functions described herein. For example, the server 106 may be embodied as a server, desktop computer, laptop computer, tablet computer, notebook, netbook, Ultrabook™ cellular phone, smartphone, wearable computing device, personal digital assistant, mobile Internet device, Internet of Things (IoT) device, router, switch, and/or any other computing/communication device capable of performing the functions described herein.

In some embodiments, the server 106 may include components similar to the components of the wearable computing system 102 described above and, therefore, the descriptions of those components have not been repeated herein for clarity of the description. Further, it should be appreciated that the server 106 may include other components, subcomponents, and/or devices commonly found in a computing device, which are not discussed herein for clarity of the description. Additionally, in some embodiments, one or more of the components of the wearable computing system 102 may be omitted from the server 106 (e.g., the sensors 120).

Although only one wearable computing system 102, one network 104, and one server 106 are shown in the illustrative embodiment of FIG. 1, the system 100 may include multiple wearable computing systems 102, networks 104, and/or servers 106 in other embodiments. For example, in some embodiments, the server 106 may communicate with multiple wearable computing systems 102. Further, in some embodiments, it should be appreciated that the wearable computing system 102 may perform all of the functions described herein (e.g., the functions of both the wearable computing system 102 and the server 106). In such embodiments, the network 104 and the server 106 may be omitted from the system 100.

It should be further appreciated that, although the server 106 is described herein as a device and/or system outside of a cloud computing environment, in other embodiments, the server 106 may be embodied as or include a cloud-based device or collection of devices within a cloud computing environment. Further, in cloud-based embodiments, the server 106 may be embodied as a server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server 106 described herein. For example, when an event occurs (e.g., data is transferred to the processor for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of certain data is made (e.g., via an appropriate user interface to the server 106), the appropriate virtual function(s) may be executed to perform the actions before eliminating the instance of the virtual function(s).

Figure 2:
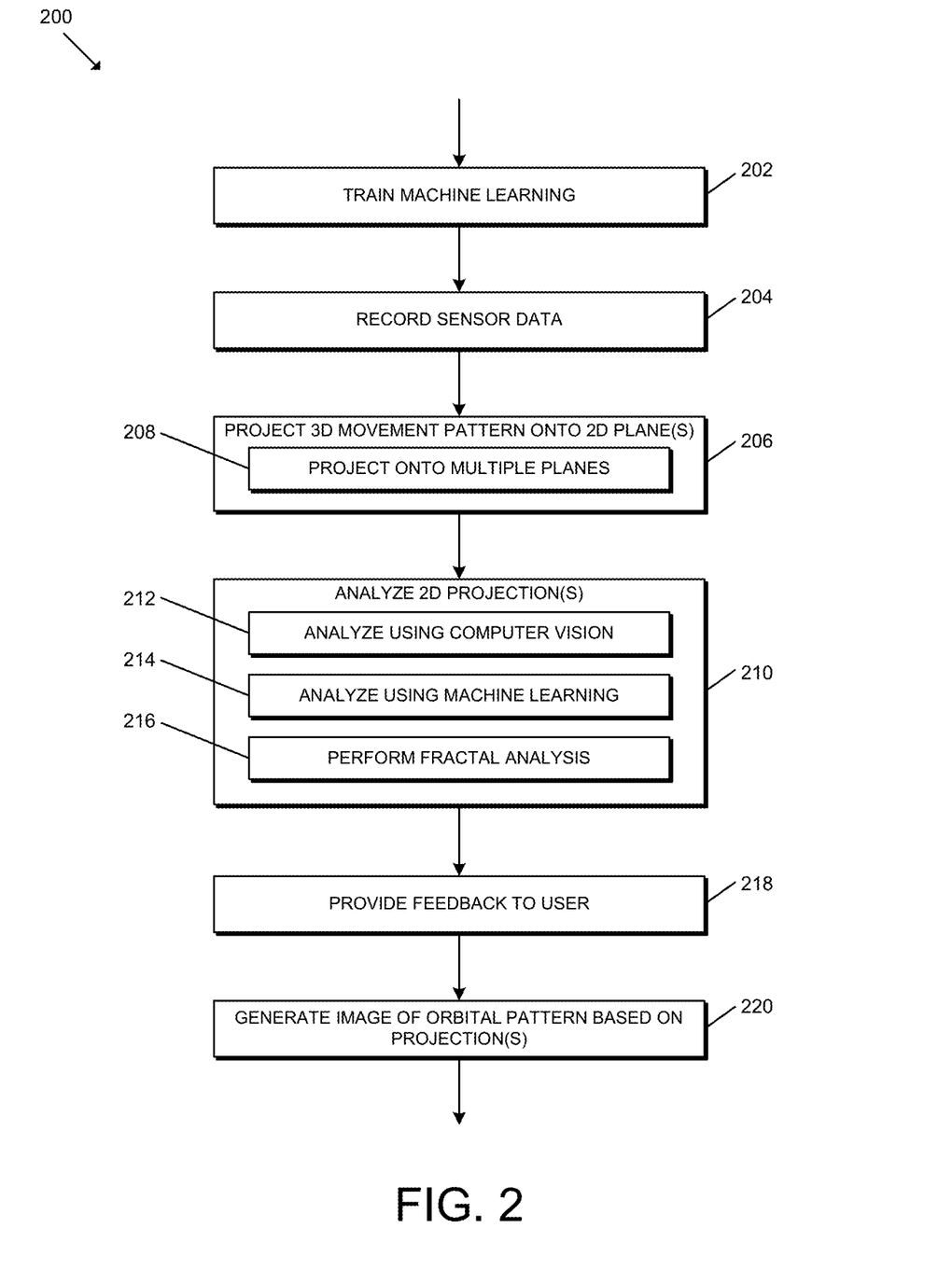
FIG. 2 is a simplified flow diagram of at least one embodiment of a method for leveraging machine learning and/or fractal analysis to classify motion using the system of FIG. 1.
Figure 3:
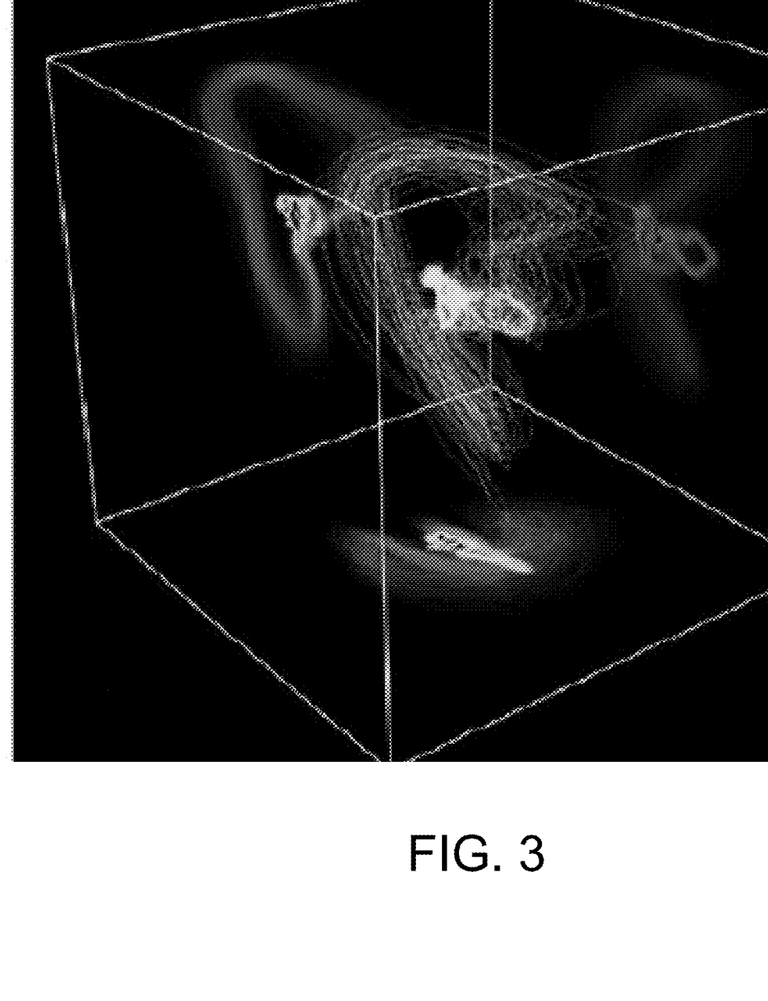
FIG. 3 depicts the projection of three-dimensional human motion in acceleration space to two-dimensional images, which can be analyzed by machine vision algorithms in accordance with the techniques described herein.
Figure 4:
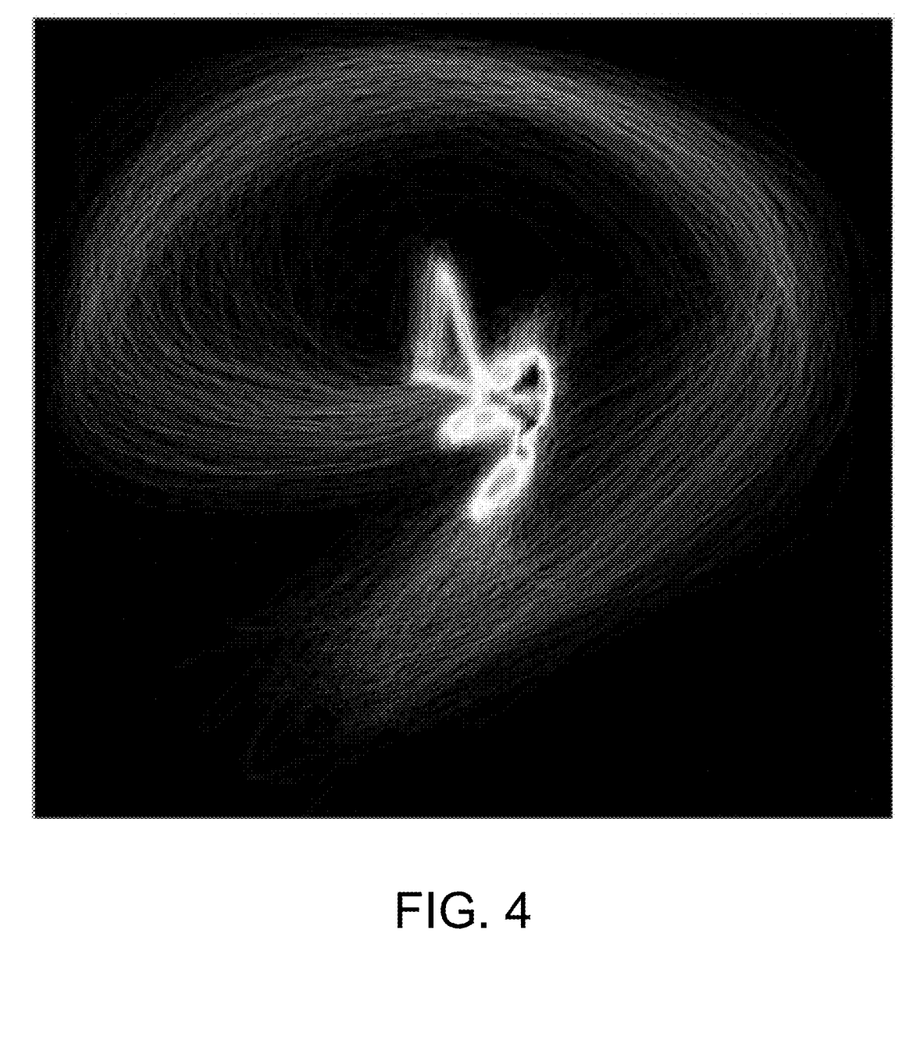
FIG. 4 depicts a resulting pattern of three-dimensional human motion in acceleration space projected to a two-dimensional still image in accordance with the techniques described herein.
Figure 5:
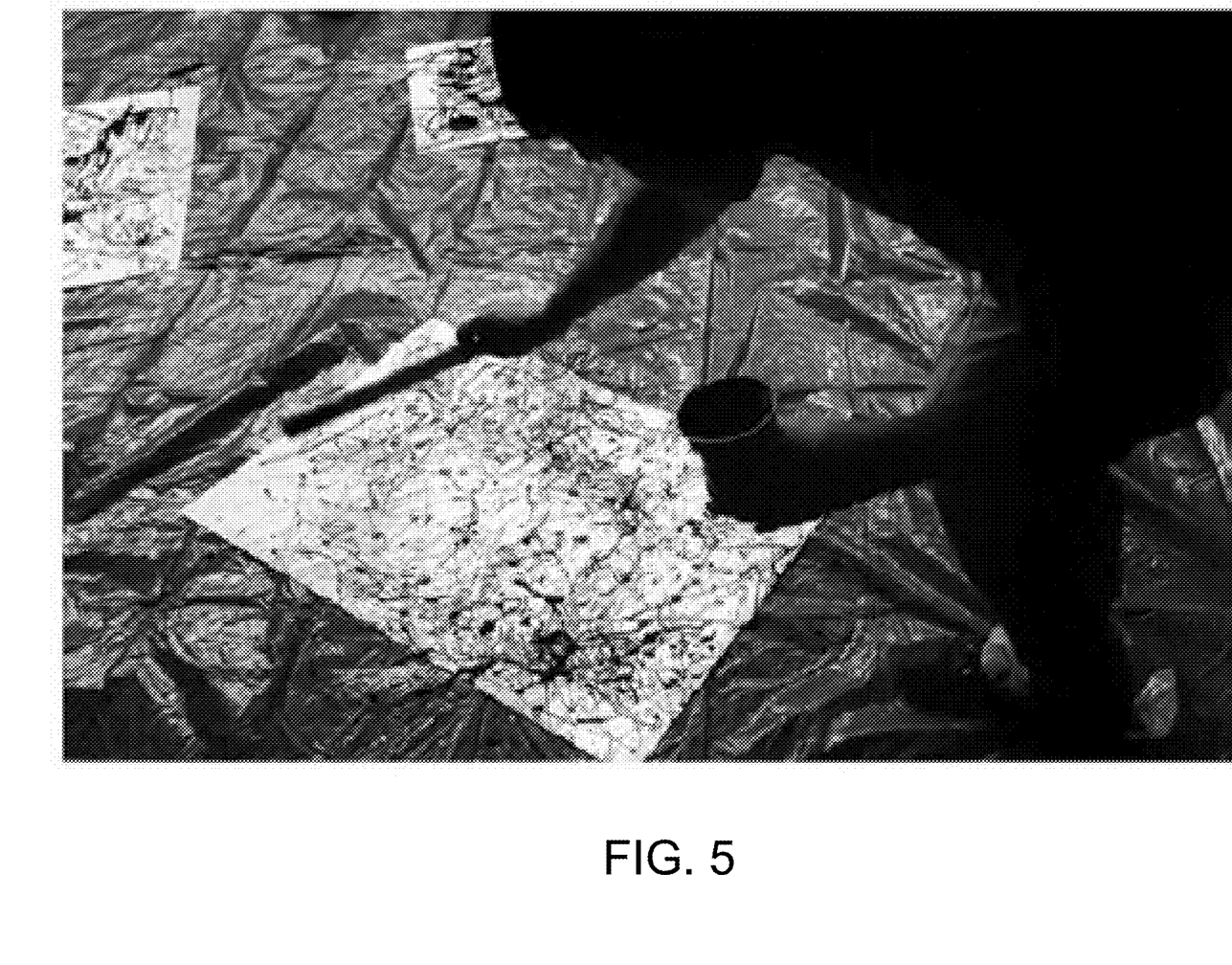
FIG. 5 depicts a two-dimensional projection of three-dimensional human motion created by dripping paint onto a canvas on the floor, such that the resulting pattern can be analyzed using machine vision and fractal analysis algorithms in order to authenticate original paintings in accordance with the techniques described herein.

Referring now to FIG. 2, in use, the system 100 (e.g., in conjunction with one or more users) may execute a method 200 for leveraging machine learning and/or fractal analysis to classify motion. It should be appreciated that the features described in reference to the method 200 may be performed in conjunction with the various methods and/or examples described herein. For example, the method 200 may be executed for authenticating artwork, determining whether a user's motion is indicative of fatigue, determining whether the user's motion is in proper form, and/or for other suitable purposes. It should be further appreciated that the particular blocks of the method 200 are illustrated by way of example, and such blocks may be combined or divided, added or removed, and/or reordered in whole or in part depending on the particular embodiment, unless stated to the contrary.

The illustrative method 200 begins with block 202 in which at least one machine learning algorithm is trained (or training of such an algorithm begins). Depending on the particular machine learning algorithm used and/or the particular embodiment, it should be appreciated that the machine learning algorithm may be supervised or unsupervised. Further, in some embodiments, the user does not need to perform any calibration of the sensors and/or the machine learning algorithm. The machine learning algorithm(s) leveraged by the system 100 may include one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

In some embodiments, the machine learning algorithm may be trained using a large library of movement samples collected in the lab or clinic. For example, the samples used for training may be recorded from many different individuals, some of whom may exhibit movement dysfunctions that have been diagnosed by a licensed physical therapist, while others may be from individuals possessing exemplary movement mechanics. In particular, inertial sensor data may be recorded and processed in a manner similar to that described below. As such, a database may be developed by recording the movement patterns of individuals who have been clinically assessed by a licensed physical therapist, trainer, or other professional based on the particular motion being assessed. Furthermore, many different movement patterns may be classified and samples recorded from many individuals, which collectively exhibit a range in the quality of movement mechanics. In some embodiments, samples may be recorded for a variety of movements and exercises including running, lifting weights, and other exercises where proper movement technique is critical. These patterns may then be used to train a machine learning algorithm in order to provide feedback to the user, as well as may be used by a coach or physical therapist to help diagnose movement dysfunctions in the user.

In block 204, the wearable computing system 102 records sensor data generated by the sensors 120. As discussed above, in some embodiments, the sensors 120 may include inertial sensors in some embodiments, which may be positioned on suitable positions on the user's body depending on the particular movements being assessed.

In block 206, the wearable computing system 102 projects a three-dimensional movement pattern indicated by the sensor data to one or more two-dimensional planes to generate corresponding two-dimensional projections. For example, in some embodiments, the three-dimensional movement pattern indicated by the sensor data may be projected onto multiple two-dimensional planes (e.g., a side plane, front plane, and top plane).

In block 208, the wearable computing system 102 analyzes the two-dimensional projection(s). In doing so, it should be appreciated that the wearable computing system 102 may leverage computer vision in block 212, machine learning in block 214 (e.g., the algorithms trained in block 202), and/or fractal analysis in block 216. As indicated above, in some embodiments, the two-dimensional projections, sensor data, and/or other data may be transmitted to a remote computing device in order to perform such analysis (e.g., in full or in part).

The wearable computing system 102 and/or the system 100 may apply various computer vision algorithms, filters, and/or techniques to generate processed versions of the two-dimensional projections and/or reformatted versions thereof. For example, in some embodiments, the wearable computing system 102 and/or the system 100 may utilize one or more image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), threshold/voting algorithms, and/or other suitable algorithms useful in analyzing the two-dimensional projections.

As indicated above, the particular machine learning algorithm(s) leveraged by the wearable computing system 102 and/or the system 100 may vary depending on the particular embodiment. For example, in various embodiments, the wearable computing system 102 and/or the system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms in analyzing the two-dimensional projections.

It should be appreciated that fractal analysis proceeds by dividing the pattern into successively smaller grid sizes, counting the number of squares in the grid filled at a given scale, and plotting the results on a log-log graph. Standard fractals will yield a straight line indicating scale invariance. The slope of this line is a measure of the complexity of the movement pattern. Some patterns may exhibit multi-scale deviations from a perfectly straight-line fit, and these variations may be useful in determining unique characteristics of the pattern in addition to the slope of the linear fit indicating complexity. There are several variations of fractal analysis that may be employed, including, but not limited to, spatial analysis, temporal fractal analysis, information dimension, multi-fractal analysis, and others. It should be appreciated that fractal analysis may be leveraged in conjunction with machine learning to provide a unique assessment of the movement pattern.

Unlike other techniques, the techniques described herein may use a multi-scale analysis, which takes into account variations in the fractal dimension at different scales. Further, merging machine learning with fractal analysis allows the system 100 to more completely describe the scaling properties of the bio-variation pattern being analyzed. A typical fractal analysis, by contrast, performs a linear regression on the scaling data in a log-log plot. The techniques described herein, however, may utilize machine learning to find a more complex curve to fit the scaling data, which provides a more comprehensive measurement of the subtle variations in the movement pattern.

As described in further detail throughout, it should be appreciated that the analysis of the projections may serve various purposes depending on the particular context of the analysis and/or the particular embodiment. For example, in various examples, the analysis of the projections may include authenticating artwork generated by the user based on the user's movement, determining whether the user's movement is indicative of fatigue, determining whether the user's movement corresponds with a proper movement form, and/or analyzing the projections to determine other relevant characteristics useful in providing feedback regarding the user's movement.

In block 218, the wearable computing system 102 provides feedback to the user and/or another party regarding the user's movement based on the analysis of the projection(s). As part of such feedback, or separate to such feedback, in block 220, the wearable computing system 102 generates one or more images indicative of the user's movement based on the analysis of the projection(s). In some embodiments, the image may be generated by overlaying multiple repetitions of the movement pattern and/or generating a "heat map" indicative of the user's movement. The image generated by the wearable computing system 102 may be referred to herein as a "portrait."

Although the blocks 202-220 are described in a relatively serial manner, it should be appreciated that various blocks of the method 200 may be performed in parallel in some embodiments.

Various processes and methods of classifying patterns generated by human motion in accordance with the illustrative teachings of the present disclosure are demonstrated in the following examples. These examples are illustrative only and are not intended to limit or preclude other embodiments. For instance, it should be understood and appreciated herein that the teachings of the present disclosure may also be used to classify other patterns of human motion. Additionally, in some embodiments, the technologies described herein may be used to analyze patterns of non-human animal motion (e.g., the gait/trot/gallop of a horse).

EXAMPLE 1: ABSTRACT ART AUTHENTICATION

With a canvas placed on the floor, an artist may perform movements over the canvas and allow paint to drop from the brush down to the floor. This technique essentially traces the artist's three-dimensional movement patterns and projects them onto a two-dimensional plane. In this way, a unique pattern is created, which captures subtle movements of the artist. Other forms of gestural abstract art may also be assessed in accordance with such techniques method (e.g., essentially any artwork produced by large-scale motions involving full body movements). In some embodiments, fractal analysis is performed in order to quantify the complexity of the movement pattern and to determine the unique multi-scale bio-variation fractal "portrait" of the artist. Moreover, the fractal analysis may measure the degree to which the movement pattern adheres to fractal scale-invariance. The unique fractal "portrait" can then be used to distinguish artworks and individual movement patterns.

A machine learning algorithm may be trained with examples of an artist, and subsequent paintings can be classified by comparison with the original training set in order to determine the authenticity of the artwork. Machine learning may also be employed to visualize the feature space of a selection of artworks as a representation of how similar these artworks are to one another.

EXAMPLE 2: DETECTING FATIGUE IN RUNNING

Inertial sensors may be placed on an individual such that data can be sampled as the user runs. It should be understood and appreciated herein that sensors may be placed anywhere on the body depending on what patterns are to be sampled.

To this end, in some embodiments, placement on the sacrum may be particularly useful for identifying movement dysfunctions and fatigue.

A primary objective of this technique is to identify fatigue, thereby minimizing the risk of injury. To this end, it should be understood that fatigue may be exhibited in bio-variation movement patterns that are unique to each individual, and these fatigue patterns may be a major contributor to running related injuries. Because each individual exhibits fatigue in a unique way, a calibration process may be used to train the machine learning algorithm to identify fatigue for each individual. This training may involve sampling movement patterns at the beginning and ending of a "long" run (relative to the user's fitness level), then classifying these patterns with machine learning. Once the calibration has been completed, the system can take samples throughout the user's run, and in turn, provide feedback indicating fatigue level, as well as provide recommendations on when the user should rest in order to minimize risk of injury. Such a calibration process is very accurate, because it can capture nuances of movement bio-variations exhibited by one person, which may not be shared by others.

In a particular embodiment, a user may begin by placing an inertial sensor on the sacrum and going for a long run relative to the user's fitness level sufficient to induce a state of fatigue. Data samples of five strides each may be recorded throughout the run. Samples recorded near the beginning of the run are considered "non-fatigued," and samples recorded near the end of the run are considered "fatigued." In some embodiments, the inertial sensors may measure both linear acceleration, as well as angular orientation and possibly additional measurements. This higher dimensional data may be processed by first projecting to a two-dimensional space, and then joining the data-points with a line or curve in order to generate an image showing the orbital pattern of the movement over five cycles. Data samples from the beginning and end of the run may then be used to train a machine learning algorithm to classify the pattern as either fatigued or non-fatigued.

It should be appreciated that similar techniques may be applied for other movements associated with running or other exercises. For example, in some embodiments, the technologies described herein may be used to detect when an individual is sufficiently "warmed up" that they can now engage in their run or other exercises. In particular, samples recorded at the beginning of a run (or other exercise) may be considered to be in a "warm up" period. As such, data samples from the beginning and later portions of the run (or other exercise) may then be used to train a machine learning algorithm to classify the pattern as being associated with the individual being either sufficiently warmed up or insufficiently warmed up for the main run/exercises to be performed safely and/or effectively.

Fractal analysis may be performed to provide additional insight into changes in the complexity of the movement pattern due to fatigue. Once this calibration process has been completed, the user's unique fatigue "portrait" can be detected and distinguished from the non-fatigued state. The patterns may be monitored in real-time and feedback provided to the user. Patterns may also be recorded for later analysis, and may indicate the percentage of samples indicating fatigue. In addition to the machine learning analysis, aesthetic images may be generated by overlaying individual strides and incrementing the pixel value where strides overlap to create a "heat-map" type image. This image may be used by itself as visual feedback. Moreover, in some embodiments, an aesthetic orbital pattern is produced, which can then be used to guide movement and/or share with other users. This feature is particularly useful when compared to conventional systems, which rely on time series analyses that may display graphs of a measurement versus time, yet do not generate a unique view of the orbital pattern as formed by repetitive movements.

The techniques may be further expanded to include the analysis of a patient suffering from a neurodegenerative disease, such as Parkinson's disease for instance. For this application, the process proceeds in a manner similar to that described above, with the exception that the fatigued state is initially determined by a trained physical therapist or other trained medical professional in order to calibrate the machine learning system. The system may be trained to identify fatigued patterns as indicated by a trained observer, after which the patient may then exercise on his or her own and receive feedback as to when it is appropriate to rest in order to minimize the risk of injury.

EXAMPLE 3: PROVIDING FEEDBACK FOR WEIGHT-LIFTING AND OTHER EXERCISES

Inertial sensors may be placed on the user's body and calibrated. The calibration procedure in this example, however, may involve a coach, training partner, or physical therapist to observe the movement of the particular individual and indicate to the system if the movement pattern was performed with good form in order to train the machine learning algorithm to identify proper movement mechanics. Subsequent repetitions of the movement after calibration may then be analyzed and classified, with feedback being provided to the user. This application can be extended to include a wide variety of exercises, artistic movements, or athletic movements. Such a calibration process is very accurate, because it can capture nuances of movement bio-variations exhibited by one person, which may not be shared by others.

In some embodiments, a user being trained to deadlift a barbell may be studied. To accomplish this, sensors may be placed on the user, for instance, along the spine, and angular and linear acceleration data may be recorded in order to monitor lumbar lordosis, thoracic kyphosis, pelvic shift, and other key indicators of proper lifting form. As indicated above, a calibration process may first be performed wherein a physical therapist, coach, or training partner observes each repetition of the lift and indicates to the system if the movement was performed properly. After a sufficient number of repetitions have been performed in order to train the machine learning algorithm, the user can then exercise without the physical therapist, coach, or training partner and the system will provide feedback regarding whether or not the exercise is being performed with proper form. In this way, the user is able to exercise independently and still receive guidance. An image of the repetitive motion's orbital pattern may be generated providing visual feedback regarding the movement pattern. Fractal analysis may be performed in order to quantify the complexity of the movement pattern, and the results may then be used to assess the quality of the motion.

Other Examples

One embodiment is directed to a unique system, components, and methods for leveraging machine learning and/or fractal analysis for classifying motion. Other embodiments are directed to apparatuses, systems, devices, hardware, methods, and combinations thereof for leveraging machine learning and/or fractal analysis for classifying motion.

According to an embodiment, a method may include recording, by a wearable computing system, sensor data generated by one or more inertial sensors of the wearable computing system, projecting, by the wearable computing system, a three-dimensional movement pattern indicated by the sensor data to at least one two-dimensional plane to generate at least one two-dimensional projection, analyzing, by the wearable computing system, the at least one two-dimensional projection using at least one computer vision algorithm, and providing, by the wearable computing system, feedback to a user of the wearable computing system regarding the user's movement based on the analysis of the at least one two-dimensional projection.

In some embodiments, projecting the three-dimensional movement pattern to the at least one two-dimensional plane may include projecting the three-dimensional movement pattern to multiple two-dimensional planes to generate corresponding two-dimensional projections.

In some embodiments, the multiple two-dimensional planes may include a side plane, a front plane, and a top plane.

In some embodiments, analyzing the at least one two-dimensional projecting may include analyzing the at least one two-dimensional projection using at least one computer vision algorithm and at least one machine learning algorithm.

In some embodiments, the method may further include training the at least one machine learning algorithm, and projecting the three-dimensional movement pattern may include projecting the three-dimensional movement pattern in response to training the at least one machine learning algorithm.

In some embodiments, providing feedback to the user regarding the user's movement may include generating an image indicative of the user's movement based on the at least one two-dimensional projection.

In some embodiments, generating the image may include generating a heat map indicative of the user's movement.

In some embodiments, analyzing the at least one two-dimensional projection may include authenticating artwork generated by the user based on the user's movement.

In some embodiments, analyzing the at least one two-dimensional projection may include determining whether the user's movement is indicative of fatigue.

In some embodiments, analyzing the at least one two-dimensional projection may include determining whether the user's movement corresponds with a proper movement form.

In some embodiments, analyzing the at least one two-dimensional projection may include transmitting the at least one two-dimensional projection to a remote computing device for analysis.

According to another embodiment, a system may include at least one inertial sensor and a wearable computing device comprising at least one processor and at least one memory having a plurality of instructions stored thereon that, in response to execution by the at least one processor, causes the wearable computing device to receive sensor data generated by the at least one sensor of the wearable computing device, project a three-dimensional movement pattern indicated by the sensor data to at least one two-dimensional plane to generate at least one two-dimensional projection, analyze the at least one two-dimensional projection using at least one computer vision algorithm, and provide feedback to a user of the wearable computing device regarding the user's movement based on the analysis of the at least one two-dimensional projection.

In some embodiments, to analyze the at least one two-dimensional projecting may include to analyze the at least one two-dimensional projection using at least one computer vision algorithm and at least one machine learning algorithm.

In some embodiments, to provide feedback to the user regarding the user's movement may include to generate an image indicative of the user's movement based on the at least one two-dimensional projection.

In some embodiments, to analyze the at least one two-dimensional projection may include to authenticate artwork generated by the user based on the user's movement.

In some embodiments, to analyze the at least one two-dimensional projection may include to determine whether the user's movement is indicative of fatigue.

In some embodiments, to analyze the at least one two-dimensional projection may include to determine whether the user's movement corresponds with a proper movement form.

According to yet another embodiment, a wearable computing system may include at least one processor and at least one memory having a plurality of instructions stored thereon that, in response to execution by the at least one processor, causes the wearable computing system to receive sensor data generated by at least one inertial sensor worn by a user, project a three-dimensional movement pattern indicated by the sensor data to at least one two-dimensional plane to generate at least one two-dimensional projection, analyze the at least one two-dimensional projection using at least one computer vision algorithm, and provide feedback regarding the user's movement based on the analysis of the at least one two-dimensional projection.

In some embodiments, to analyze the at least one two-dimensional projecting may include to analyze the at least one two-dimensional projection using at least one computer vision algorithm and at least one machine learning algorithm.

In some embodiments, to provide feedback regarding the user's movement may include to generate an image indicative of the user's movement based on the at least one two-dimensional projection.

What is claimed is:

1. A method, comprising:
recording, by a wearable computing system, sensor data generated by one or more inertial sensors of the wearable computing system, the sensor data comprising acceleration data in multiple dimensions;
projecting, by the wearable computing system, a three-dimensional acceleration pattern indicated by the acceleration data to at least one two-dimensional plane to generate at least one two-dimensional acceleration projection having a first acceleration dimension and a second acceleration dimension, where the first acceleration dimension is orthogonal to the second acceleration dimension and both the first and second acceleration dimensions have units of distance per second squared;
analyzing, by the wearable computing system, the at least one two-dimensional acceleration projection using at least one computer vision algorithm; and
providing, by the wearable computing system, feedback to a user of the wearable computing system regarding the user's movement based on the analysis of the at least one two-dimensional acceleration projection, wherein the wearable computing system is coupled to the user such that movement of the user is sensed by the one or more inertial sensors of the wearable computing system, wherein the sensor data generated by the one or more inertial sensors is caused by movement of the user, and wherein the feedback is in the form of feedback data related to an assessment of the movement of the user in the past and without a prognostication of future user movement;

wherein analyzing the at least one two-dimensional acceleration projection comprises analyzing the at least one two-dimensional acceleration projection using fractal analysis at multiple scales, including:

dividing the at least one two-dimensional acceleration projection into a plurality of successive grids of successively smaller grid scales, and for each successive grid of a given grid scale counting the number of squares in that grid filled by the at least one two-dimensional acceleration projection at that given grid scale;

plotting scaling data of the grid scale versus the counted number of squares in that grid filled by the at least one two-dimensional acceleration projection on a log-log graph; and fitting a line or curve to the plotted scaling data.

2. The method of claim 1, wherein projecting the three-dimensional acceleration pattern to the at least one two-dimensional plane comprises projecting the three-dimensional acceleration pattern to multiple two-dimensional planes to generate corresponding two-dimensional acceleration projections that each have a first dimension that has units of distance per second squared in a first direction and a second dimension that has units of distance per second squared in a second direction, where the first direction is orthogonal to the second direction.

3. The method of claim 2, wherein the multiple two-dimensional planes comprise a side plane, a front plane, and a top plane.

4. The method of claim 1, wherein analyzing the at least one two-dimensional acceleration projection comprises analyzing the at least one two-dimensional acceleration projection using at least one computer vision algorithm and at least one machine learning algorithm.

5. The method of claim 4, further comprising training the at least one machine learning algorithm; and wherein projecting the three-dimensional acceleration pattern comprises projecting the three-dimensional acceleration pattern in response to training the at least one machine learning algorithm.

6. The method of claim 1, wherein providing feedback to the user regarding the user's movement comprises generating an image indicative of the user's movement based on the at least one two-dimensional acceleration projection.

7. The method of claim 6, wherein generating the image comprises generating a heat map indicative of the user's acceleration data.

8. The method of claim 1, wherein analyzing the at least one two-dimensional acceleration projection comprises determining whether the user's acceleration data is indicative of potential injury or inefficient motion.

9. The method of claim 1, wherein analyzing the at least one two-dimensional acceleration projection comprises determining whether the user's acceleration data corresponds with a proper movement form.

10. The method of claim 1, wherein analyzing the at least one two-dimensional acceleration projection comprises transmitting the at least one two-dimensional acceleration projection to a remote computing device for analysis.

11. A system, comprising:

at least one inertial sensor; and a wearable computing device comprising at least one processor and at least one memory having a plurality of instructions stored thereon that, in response to execution by the at least one processor, causes the wearable computing device to:

receive sensor data generated by the at least one sensor of the wearable computing device, where the sensor data includes acceleration data in multiple dimensions;

project a three-dimensional acceleration pattern indicated by the acceleration data to at least one two-dimensional plane to generate at least one two-dimensional acceleration projection with a first acceleration dimension and a second acceleration dimension, where the first acceleration dimension is orthogonal to the second acceleration dimension and both the first and second acceleration dimensions have units of distance per second squared;

analyze the at least one two-dimensional acceleration projection using at least one computer vision algorithm; and provide feedback to a user of the wearable computing device regarding the user's movement based on the analysis of the at least one two-dimensional acceleration projection, wherein the wearable computing device is coupled to the user such that movement of the user is sensed by the at least one sensor of the wearable computing device, wherein the sensor data generated by the at least one sensor is caused by movement of the user, and wherein the feedback is in the form of feedback data related to an assessment of the movement of the user in the past and without a prognostication of future user movement;

wherein to analyze the at least one two-dimensional acceleration projection comprises to analyze the at least one two-dimensional acceleration projection with fractal analysis at multiple scales that includes:

to divide the at least one two-dimensional acceleration projection into a plurality of successive grids of successively smaller grid scales, and for each successive grid of a given grid scale to count the number of squares in that grid filled by the at least one two-dimensional acceleration projection at that given grid scale;

plot scaling data of the grid scale versus the counted number of squares in that grid filled by the at least one two-dimensional acceleration projection on a log-log graph; and fit a line or curve to the plotted scaling data.

12. The system of claim 11, wherein to analyze the at least one two-dimensional acceleration projection comprises to analyze the at least one two-dimensional acceleration projection using at least one computer vision algorithm and at least one machine learning algorithm.

13. The system of claim 11, wherein to provide feedback to the user regarding the user's movement comprises to generate an image indicative of the user's movement based on the at least one two-dimensional acceleration projection.

14. The system of claim 11, wherein to analyze the at least one two-dimensional acceleration projection comprises to determine whether the user's acceleration data is indicative of potential injury.

15. The system of claim 11, wherein to analyze the at least one two-dimensional acceleration projection comprises to determine whether the user's acceleration data corresponds with a proper movement form.

16. A wearable computing system, comprising:
at least one processor; and
at least one memory having a plurality of instructions stored thereon that, in response to execution by the at least one processor, causes the wearable computing system to:
receive sensor data generated by at least one inertial sensor worn by a user, where the sensor data includes acceleration data in multiple dimensions;
project a three-dimensional acceleration pattern indicated by the acceleration data to at least one two-dimensional plane to generate at least one two-dimensional acceleration projection with a first acceleration dimension and a second acceleration dimension, where the first acceleration dimension is orthogonal to the second acceleration dimension and both the first and second acceleration dimensions have units of distance per second squared;
analyze the at least one two-dimensional acceleration projection using at least one computer vision algorithm;
analyze the at least one two-dimensional acceleration projection with fractal analysis at multiple scales that includes:
to divide the at least one two-dimensional acceleration projection into a plurality of successive grids of successively smaller grid scales, and for each successive grid of a given grid scale to count the number of squares in that grid filled by the at least one two-dimensional acceleration projection at that given grid scale;
plot scaling data of the grid scale versus the counted number of squares in that grid filled by the at least one two-dimensional acceleration projection on a log-log graph; and
fit a line or curve to the plotted scaling data; and
provide feedback regarding the user's movement based on the analysis of the at least one two-dimensional acceleration projection, wherein the at least one inertial sensor is coupled to the user such that movement of the user is sensed by the at least one inertial sensor, wherein the sensor data generated by the at least one inertial sensor is caused by movement of the user, and wherein the feedback is in the form of feedback data related to an assessment of the movement of the user in the past and without a prognostication of future user movement.

17. The wearable computing system of claim 16, wherein to analyze the at least one two-dimensional acceleration projection comprises to analyze the at least one two-dimensional acceleration projection using at least one computer vision algorithm and at least one machine learning algorithm.

18. The wearable computing system of claim 16, wherein to provide feedback regarding the user's movement comprises to generate an image indicative of the user's movement based on the at least one two-dimensional acceleration projection.

* * * * *